United States Patent [19]
Crisman et al.

[11] Patent Number: 5,386,512
[45] Date of Patent: Jan. 31, 1995

[54] SYSTEM FOR DERIVING AND TESTING MUTUAL CAPABILITY SET AFTER RECEIVING UPDATED CAPABILITY FROM OTHER PROCESSORS AND BEFORE REQUESTING SERVICE INFORMATION

[75] Inventors: Mary B. Crisman, Hopewell Junction; James C. Daly, Millbrook; Arthur M. Day, Wappingers Falls; Charles W. Gainey, Jr., Poughkeepsie; Paul G. Greenstein, Fishkill; Duane C. Hughes, LaGrange; John T. Rodell, Wappingers Falls, all of N.Y.; Kathleen M. Walsh, Gaithersburg, Md.

[73] Assignee: International Business Machines Corporation, Armonk, N.Y.

[21] Appl. No.: 164,658

[22] Filed: Dec. 9, 1993

Related U.S. Application Data

[63] Continuation of Ser. No. 732,985, Jul. 19, 1991, abandoned.

[51] Int. Cl.⁶ ............................................. G06F 13/00
[52] U.S. Cl. .................................. 395/200; 395/800; 364/222.2; 364/DIG. 1; 364/221.7; 364/230.3; 364/242.94
[58] Field of Search ................ 395/200, 375, 800; 364/252.5, 264.6, 264.7, 940.81, 937, 947.4

[56] References Cited

U.S. PATENT DOCUMENTS

| | | | |
|---|---|---|---|
| 3,629,854 | 12/1971 | Hauck | 364/229.1 |
| 4,543,627 | 9/1985 | Schwab | 364/228.3 |
| 4,648,061 | 3/1987 | Foster | 364/900 |
| 4,718,002 | 1/1988 | Carr | 395/200 |
| 4,989,130 | 1/1991 | Moriyama et al. | 364/200 |
| 5,038,275 | 8/1991 | Dujari | 364/200 |
| 5,095,445 | 3/1992 | Sekiguchi | 364/514 |
| 5,101,348 | 3/1992 | Arrowood et al. | 395/200 |
| 5,109,486 | 4/1992 | Seymour | 395/200 |
| 5,146,564 | 9/1992 | Evans et al. | 364/240.9 |
| 5,155,854 | 10/1992 | Flynn et al. | 395/725 |
| 5,202,998 | 4/1993 | Yanes | 395/725 |

OTHER PUBLICATIONS

Telecommunication Networks by Mischa Schwartz, 1987, pp. 337–347.

Primary Examiner—Thomas C. Lee
Assistant Examiner—Moustafa M. Meky
Attorney, Agent, or Firm—William A. Kinnaman, Jr.; William B. Porter

[57] ABSTRACT

A dynamic capability exchange mechanism permits two processing entities to notify each other of initial properties, or processing capabilities, as well as subsequent changes to those properties or capabilities. Before requesting a service, or function, of the other entity, one entity consults a mutual characteristic field (constructed from the current properties, or characteristics) to determine if the service, or function, is jointly available. A transport layer, acting as the communication mechanism between the two entities, provides for bidirectional communications between entities including a Control Program and a Service Call Logical Processor. The transport layer provides multiplexing, priority, failure, pacing, and buffer spanning support.

8 Claims, 15 Drawing Sheets

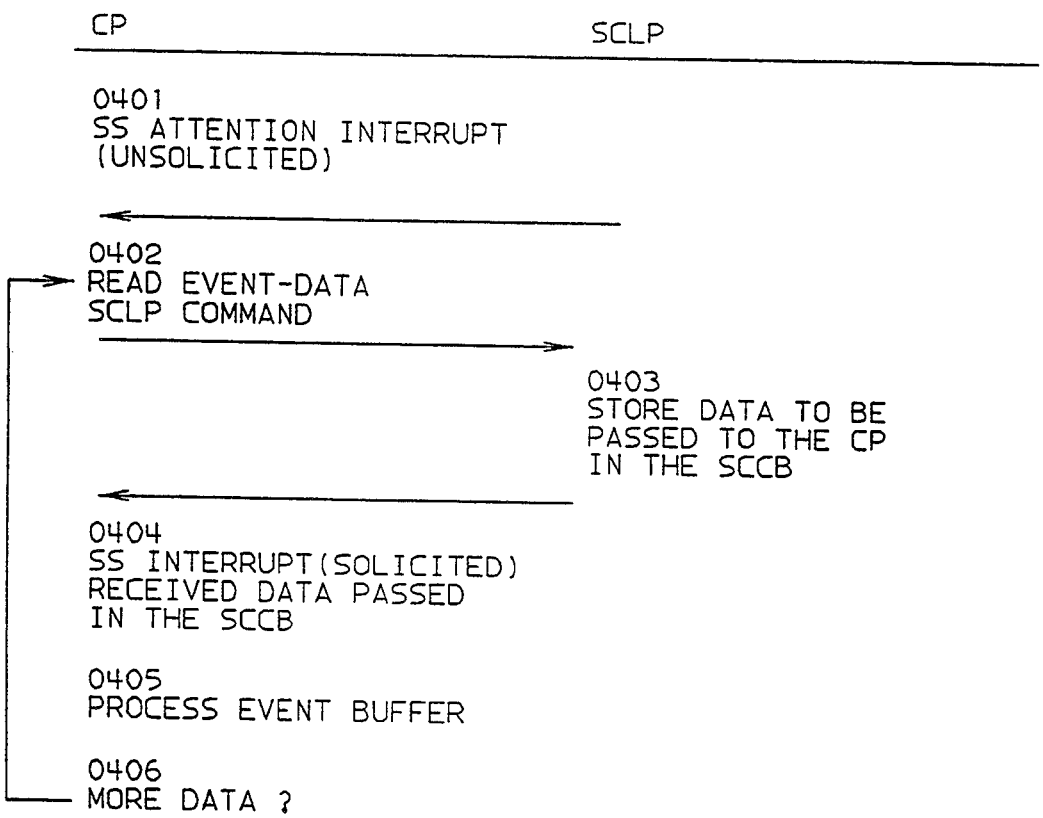
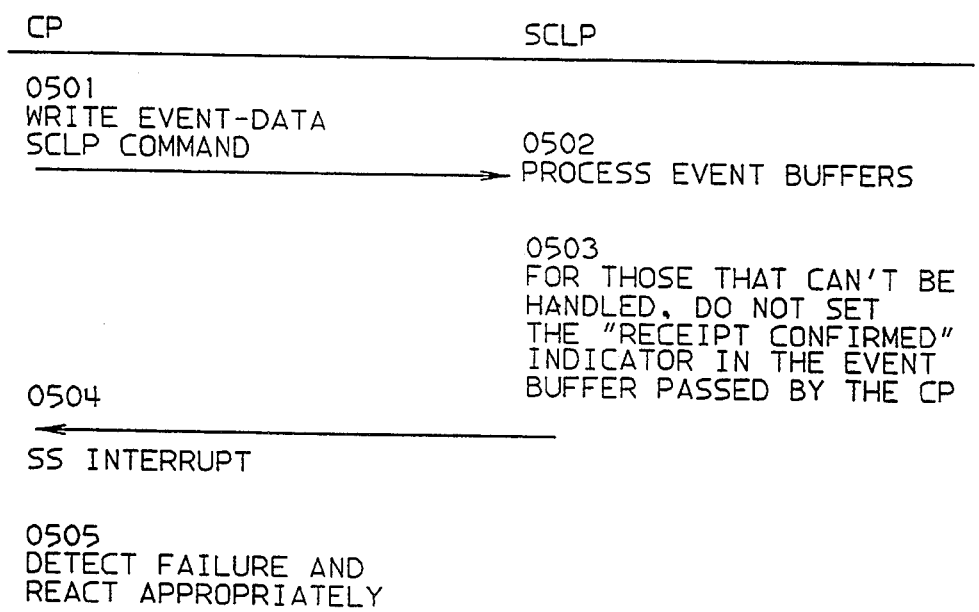

FIG. 7

CP                                                          SCLP

0701
SS ATTENTION INTERRUPT
(UNSOLICITED)
←

CP IS TEMPORARILY UNWILLING TO
ACCEPT ALL DATA TYPES(E.G.,ENTRY
INTO RECOVERY)-IT ISSUES THE READ
SELECTIVE EVENT DATA SCLP COMMAND
THAT SPECIFIES DESIRED DATA TYPES

0702
READ EVENT-DATA SELECTIVE
SCLP COMMAND                                                0703
→                                                           PRESENT ONLY
                                                            SPECIFIED DATA
                                                            TYPES. KEEP
                                                            THE REST
                                                            UNTIL REQUESTED

0704
←
SS INTERRUPT(SOLICITED)

0705
PROCESS EVENT BUFFERS. IF
FAILURE WHILE PROCESSING,
SEND IT BACK USING WRED

0706
MORE DATA ?

WHEN TEMPORARY CONDITION HAS
PASSED(E.G.,EXIT FROM RECOVERY)-
PERFORM THE NORMAL READ EVENT-DATA
TO SEE THE REST OF THE INFORMATION

0707
READ EVENT-DATA SCLP COMMAND           0708
→                                      PRESENT ALL DATA
                                       TYPES

0709
←
SS INTERRUPT(SOLICITED)

0710
MORE DATA ?

FIG. 12

SCCB

SCLP SEND MASK(PSM)
11111111 00000000........  ........    1201

SCLP RECEIVE MASK(PRM)
11111000 00110000........  ........    1202

OPERATING SYSTEM SEND MASK(SSM)
11000011 00100000........  ........    1203

OPERATING SYSTEM RECEIVE MASK(SRM)
11000100 00010000........  ........    1204

FIG. 13

THE RESULTING ALLOWED DATA STRUCTURES

SCLP → OPERATING SYSTEM
11000100 00000000........  ........    1301

OPERATING SYSTEM → SCLP
11000000 00100000........  ........    1302

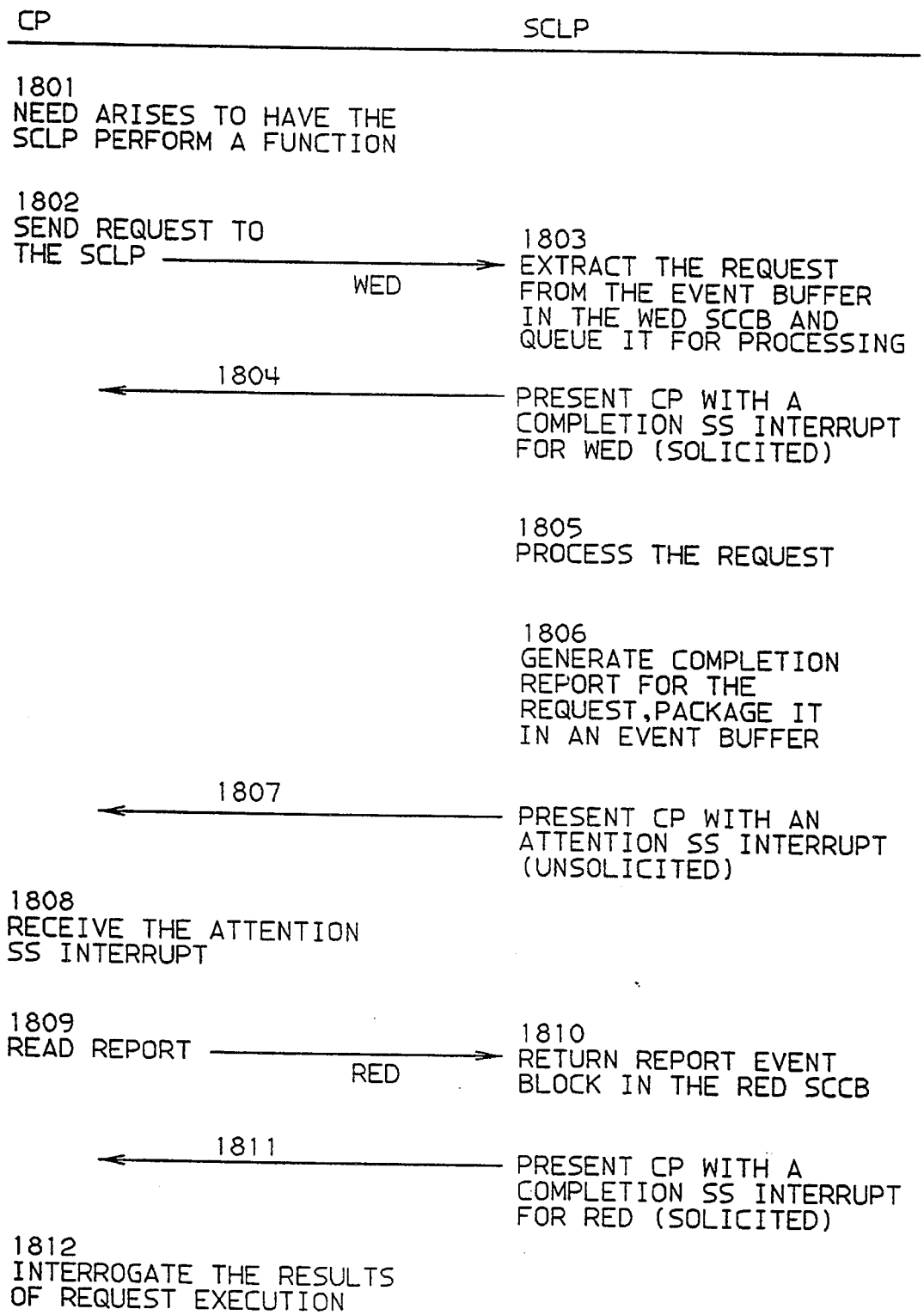

SYSTEM FOR DERIVING AND TESTING MUTUAL CAPABILITY SET AFTER RECEIVING UPDATED CAPABILITY FROM OTHER PROCESSORS AND BEFORE REQUESTING SERVICE INFORMATION

This is a continuation of copending application(s) Ser. No. 07/732,985 filed on Jul. 19, 1991 now abandoned.

BACKGROUND OF THE INVENTION

1. Field of the Invention

This invention relates to communications between constituent elements of a data processing system. More particularly, it relates to communicating changes in processing capability between an operating system and a service call logical processor.

2. Background Art

In systems such as IBM's S/390, the Processor Controller Element (PCE) or Service Processor (SVP) is used for monitoring of the Central Processor Complex (CPC), its recovery, and reconfiguration.

Traditionally, interactions between a control program (CP) running on a central processor complex (CPC) and the processor controller element (PCE) or service processor (SVP) are performed by means of Service Call Logical Processor (SCLP) commands. The SCLP is a logical entity that may be comprised of several hardware elements. Commonly, on high-end processors, the SCLP is a part of the PCE; on low-end processors, the SCLP functions may be part of the SVP or may be a combination of CPU microcode and the SVP. In general, since the SCLP is a logical entity, its functions may also be performed by devices attached to the PCE or SVP, including a connecting network.

The SCLP command mechanism allows the CP to request the SCLP, wherever it is actually implemented, to perform a specific action. Execution of an SCLP command, from the view point of the control program, consists of two phases: issuance of the SCLP command, and completion of the SCLP command. The SCLP command is issued by means of the Service Call instruction (SERVC).

In the past, the method for interactive communication from the CP to the SCLP was often inefficient in getting the SCLP to process software (CP) requests in a timely manner.

1. The processors (PCE/SVP) that execute the SCLP commands are relatively slow compared to the processing speed of a CPU where the CP executes. Depending upon the particular command requested, the SCLP may take anywhere from one second to several minutes to complete the command.
2. It is very disruptive for the CP to do extensive preparation, to have to suspend its processing while waiting for the solicited interrupt, and then to learn after the fact that a request sent to the SCLP cannot be processed by the SCLP.

With the prior art, the CP had to try before it learned that a function was not available for a request and had no indication that the unavailability was temporary or permanent. The following are other prior art mechanisms for notification of failure or inability to perform a function:

1. Condition codes set by instructions (after the fact notification).
2. Response/reason codes for service calls indicating not installed or inactive SCLP functions (also after the fact).
3. Disablement for interrupts (indicates a DESIRE to avoid processing of designated interrupt, NOT the inability to process it).
4. Read-SCP-Info SCLP command provides data on installed hardware facilities (static designation of installed, but not necessarily active facilities).
5. The Service Processor Damage (SPD) machine check that indicates loss of SCLP function. This has no capability to indicate whether loss is temporary or permanent, or if function is ever subsequently restored. Furthermore, the SPD machine check indicates complete loss of SCLP functions, and has no way of indicating any subset of function that may still be available and unaffected by the problem.

The CP learns the results of the SCLP activity by interrogating SCLP response information. This is the first indication to the CP that requested event was available and that is could or could not process the request.

This method has resulted in the following problems:

1. It required the CP to incur the additional overhead of a potentially unnecessary use of the interfaces for each and every request.
2. The interface between the CP and SCLP can handle only one SCLP command at a time thereby placing additional overhead on the CP to manage a queue of requests. The need to enqueue and try requests that are destined to fail increases this problem.
3. The CP often did not receive timely notification when the SCLP was incapable of satisfying a request. On some machines, the SCLP functions can take several seconds to perform. If the CP is forced to actually issue a request to learn that it cannot be serviced, the CP might have to wait that interval for the SCLP to complete another operative function before being notified that his request cannot be satisfied.
4. When multiple functions are inoperative, they can be detected only one at a time when the need to use arises.
5. The inefficiencies inherent in items 1, 2, 3, and 4 exist for the life of the system and must be repeated each time an inoperative function is desired. When a sender first receives a response indicating that the receiver cannot perform a given function, the sender cannot assume that the function is permanently inoperative and not submit any subsequent requests. The correct assumption has to be that both the SCLP and the CP can dynamically acquire and lose processing capability during the operation of the system. Therefore, each time a function is required, the request must be resubmitted and the resultant overhead and rejection is experienced again and again.
6. During the interval between issuance of the SCLP command and the arrival of the SS interrupt indicating SCLP command completion, the "waiting" program (whether it is the CP itself or an application program running under the SCP) will probably be unable to respond to signals from other external sources (such as an operator or another CP). This, in turn, might cause the issuer of this other signal to take some disruptive, unnecessary recovery action (such as terminating the waiting program).

7. No method existed to indicate only a partial loss of SCLP function. The SPD machine check means that the entire SCLP is not available.

8. No method existed to indicate reacquisition of the SCLP and SCLP function when the prior loss of either full or partial function was only a temporary outage.

In the past, the method for interactive communication from the CP to the SCLP was often inefficient in getting the SCLP to process operating system requests in a timely manner. Limitations include:

1. The one-way only communication does not permit the SCLP to initiate a transaction or a conversation to the CP.

In some cases, the CP has to poll the SCLP at a regular interval to determine if the SCLP has information to present to the CP. The CP is said to be soliciting the information from the SCLP.

2. Only one SCLP command can be issued at a time by the control program.

Until the active SCLP command completes and the service-signal interrupt is presented, any other SCLP requests are rejected by the hardware. If the CP has multiple users overlapping their requests to the SCLP, the CP has to serialize the requests.

3. The processors (PCE/SVP) that execute the SCLP commands are relatively slow compared to the processing speed of a CPU where the CP executes.

Depending upon the particular command requested, the SCLP may take anywhere from one second to several minutes to complete the command.

More complex installation requirements combined with new and improved data processing hardware have produced the need for flexible two-way communications between the SCLP and CP that is running on that CPC. This improved "communication" consists of the passing of data, messages, and/or commands from either the CP or the SCLP to the other. For such unsolicited information coming from the SCLP to the control program, it also became necessary to have the SCLP present such information to the control program as soon as the SCLP is aware of its existence, without requiring the control program to periodically poll the SCLP for the existence of such information.

There are three major reasons for developing two-way communications between the SCLP and the CP.

1. The requirement that operator control of both the hardware and software of a CPC be done from a single console has been met by designating the hardware console (i.e., system console), which is attached to the PCE, as the single control point. This means that the PCE and CP must have new interfaces to pass messages and commands between the CP and the operator at the system console.

2. Events perceived or performed by the SCLP may require processing by the CP. Therefore the SCLP requires a way of notifying the CP that an event has occurred and to pass event-related data to the CP.

3. Multiple CPCs that are connected to each other in a network or SYSPLEX environment require that the SCLP on a given CPC be a two-way conduit for data and commands between its own CP and the other CPCs in the network or SYSPLEX.

With the growth of new system functions and applications that use various SCLP facilities, it will be necessary to permit multiple concurrent users of SCLP functions. It also will be necessary to overlap execution of SCLP functions and to improve efficiency of the CP/SCLP data transfer by transferring different types of unrelated data on a single SCLP command.

With the growth of new functions and applications resulting in increased frequency of use and new uses of SCLP functions, it will be necessary to improve performance of the SCLP interactions. The performance improvements will result from concurrent, parallel execution of unrelated functions.

SUMMARY OF THE INVENTION

This invention provides:

A transport layer as the communication vehicle between the two entities. This layer provides for:

1. Establishment of a two-way communication between the CP and the SCLP.
   a. The SCLP interface is now a peer-to-peer interface.
   b. The SCLP can initiate the transmission to the CP of complete or segmented transactions originated by end applications/functions.

2. The SCLP interface to represent a physical connectivity path in the larger network that encompasses multiple heterogeneous machines and control programs. Such a path can be used for remote operations, distribution of service, error data collection, etc.

3. Multiplexing of requests for processing of multiple concurrent functions.

4. The SCLP to send data to the CP without solicitation by the CP.

5. The SCLP to request actions to be performed by the CP and to receive back reports of completion of those actions.

A dynamic capability exchange mechanism for two processing entities (in particular, a CP and an SCLP):

1. To pass and solicit information from the other, and to notify each other of their initial capability to handle the other's request to process an SCLP event.

2. To subsequently and dynamically notify each other whenever there is an increase/reduction in their processing capability.

3. To determine what events can be handled by the other, and to send just those requests that the other can handle.

As a result of using this mechanism:

1. A sender knows before hand for any required function, whether the receiver can perform that function. Both the SCLP and the CP can dynamically acquire and lose processing capability during the operation of the system and can quickly notify the other about the change in operative state.

Since the sender knows ahead of time that a given request cannot be performed, that request is not made. The related "request queue" is therefore shorter, resulting in improved performance and throughput for both the sender and receiver (and any intermediate data-transfer node in a network).

2. The sender is not forced to actually issue a request to learn that it cannot be serviced. This avoids waiting for the SCLP to complete another operative function before notifying the sender that his request cannot be satisfied. This lets the sender continue to respond to signals from other external sources, and avoids taking some disruptive, unnecessary recovery action (such as terminating the waiting program).

3. When multiple functions are inoperative, this can be detected simultaneously.
4. SCLP, as an intermediate node in passing an event from a external originator to the CP, can now return some acknowledgement (if required) to the originator of the event that it was received at its final destination (an application running under the CP). The SCLP also does not need to "remember" events that it has passed to the CP.
5. The situation where the receiver of an event may be operational but in a state (for example, performing recovery processing) where it cannot process the event can also be predetermined. The sender avoids the situation where it is left with the impression that the event processing succeeded.

The figure illustrates the principles of operation for the Service Call (SERVC) instruction.

Figure 2:
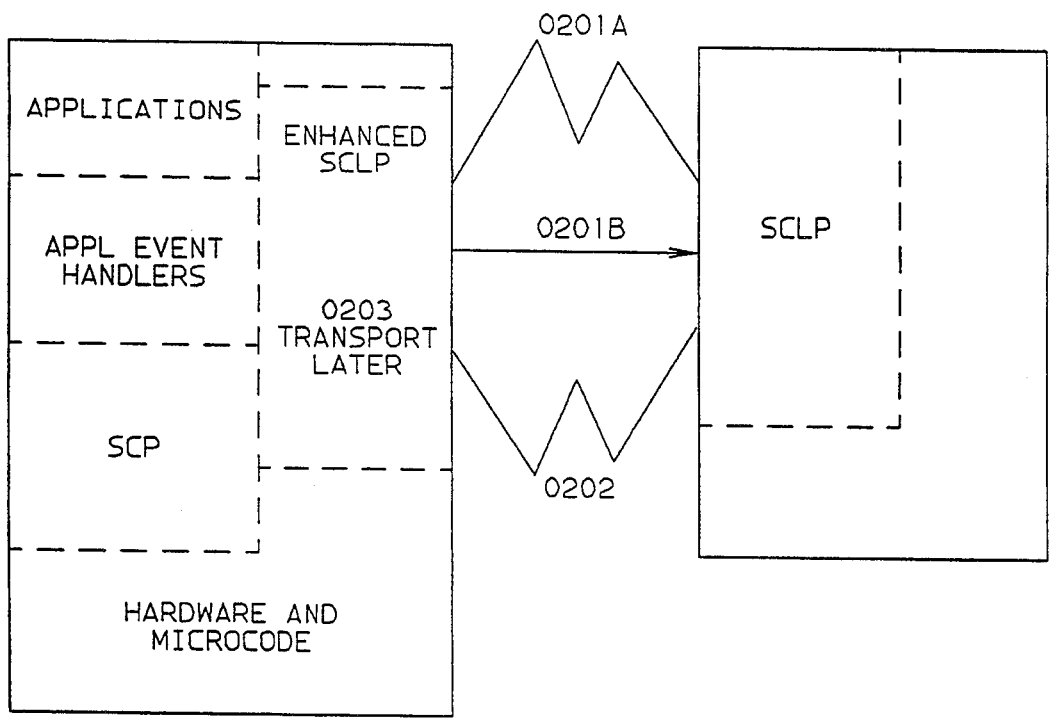

FIG. 2 is a block diagram of the relationship between the CP and its associated SCLP with the present invention.

Figure 3:
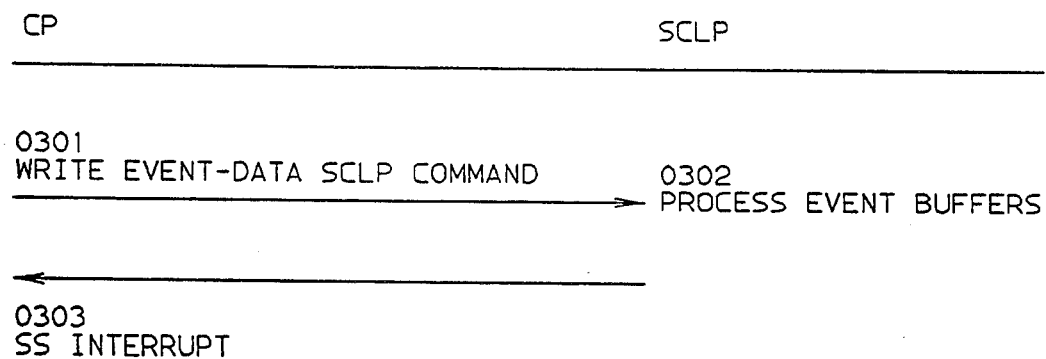

FIGS. 3–7 are illustrations of the set of protocols that utilize the features of the present invention to achieve bidirectional communication:

FIG. 3 is a logic/data flow diagram illustrating the two-way (bidirectional) communication mechanism supported by the present invention where the conversation/transaction is initiated by the CP.

FIG. 4 is a logic/data flow diagram illustrating the two-way (bidirectional) communication mechanism supported by the present invention where the conversation/transaction is initiated by the SCLP.

FIG. 5 is a logic/data flow diagram illustrating the two-way (bidirectional) communication mechanism supported by the present invention where the conversation/transaction is initiated by the CP, and where the SCLP determines that it cannot handle the event.

Figure 6:
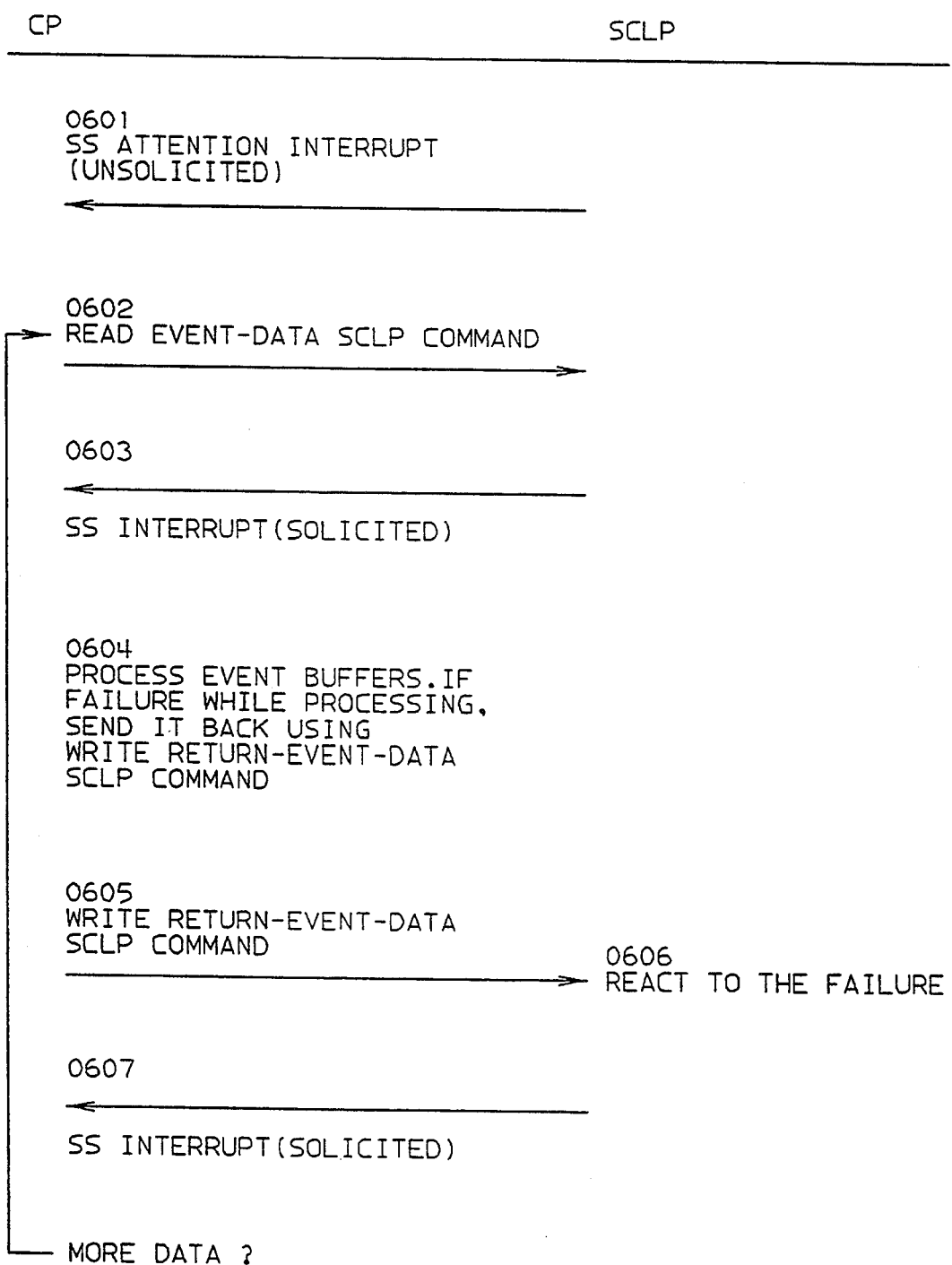

FIG. 6 is a logic/data flow diagram illustrating the two-way (bidirectional) communication mechanism supported by the present invention where the conversation/transaction is initiated by the SCLP, and where the CP encounters failures when processing an event.

FIG. 7 is a logic/data flow diagram illustrating the two-way (bidirectional) communication mechanism supported by the present invention where the CP temporarily restricts the receipt of acceptable data for selected events being sent by the SCLP.

Figure 8:
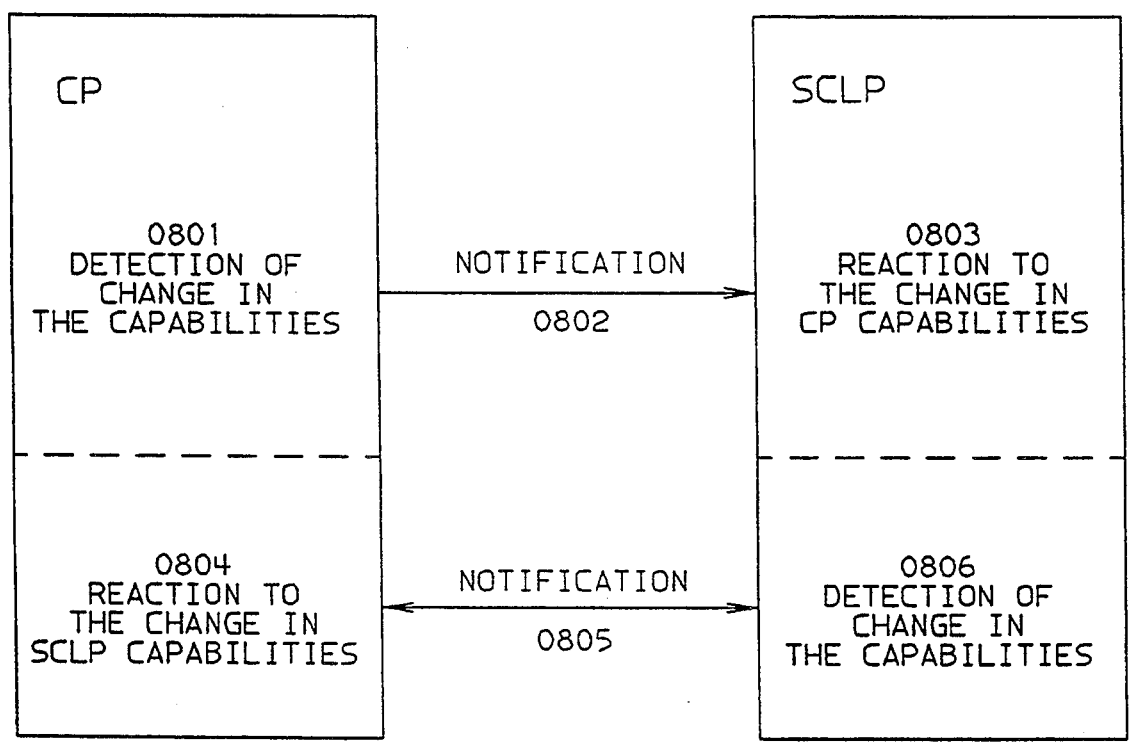

FIG. 8 is a block diagram showing the overall scheme of detection and notification of the changes in capabilities of the SCLP and CP.

Figure 9:
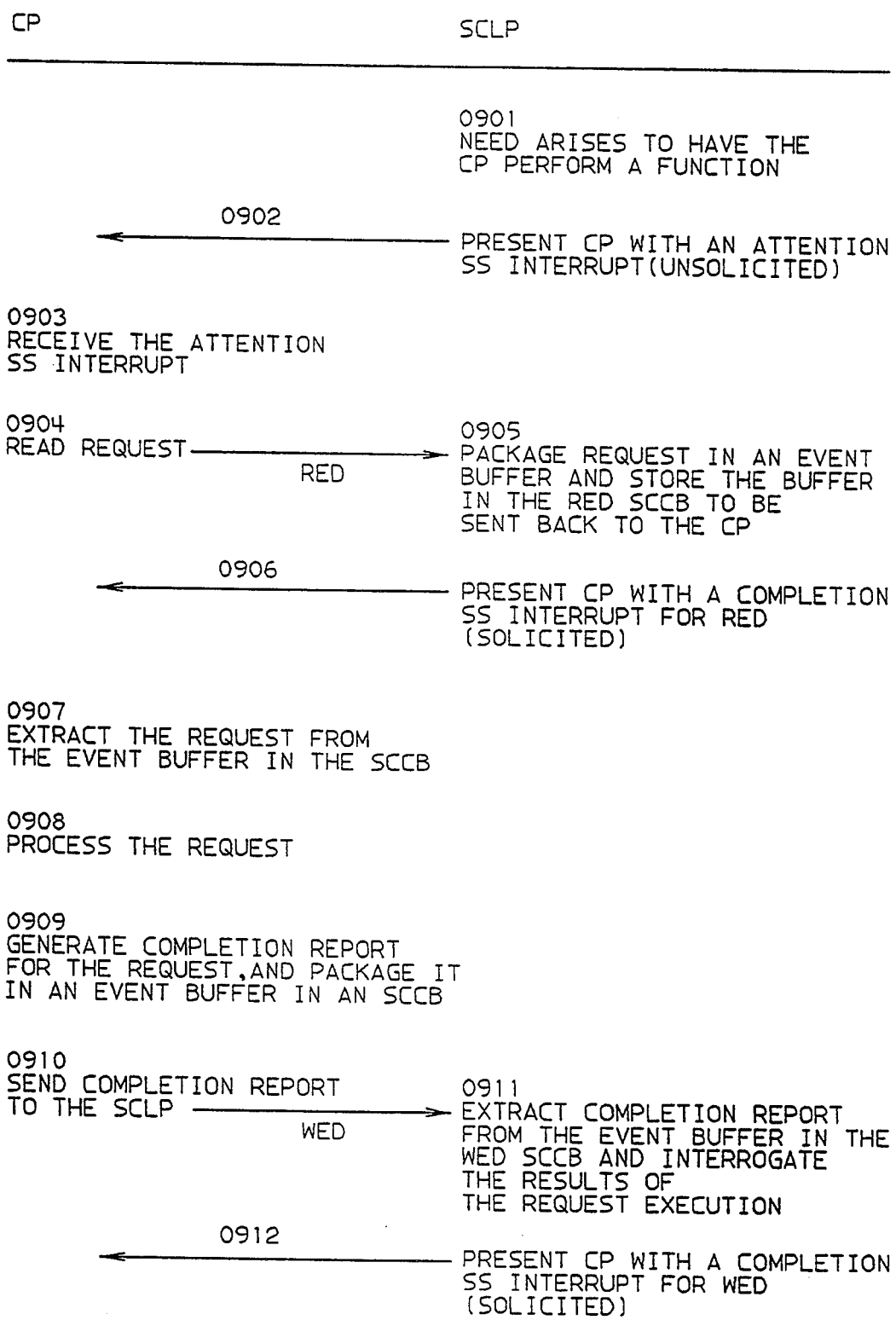

FIG. 9 is a logic/data flow diagram illustrating the process of execution of an SCLP request by a CP.

Figure 10:
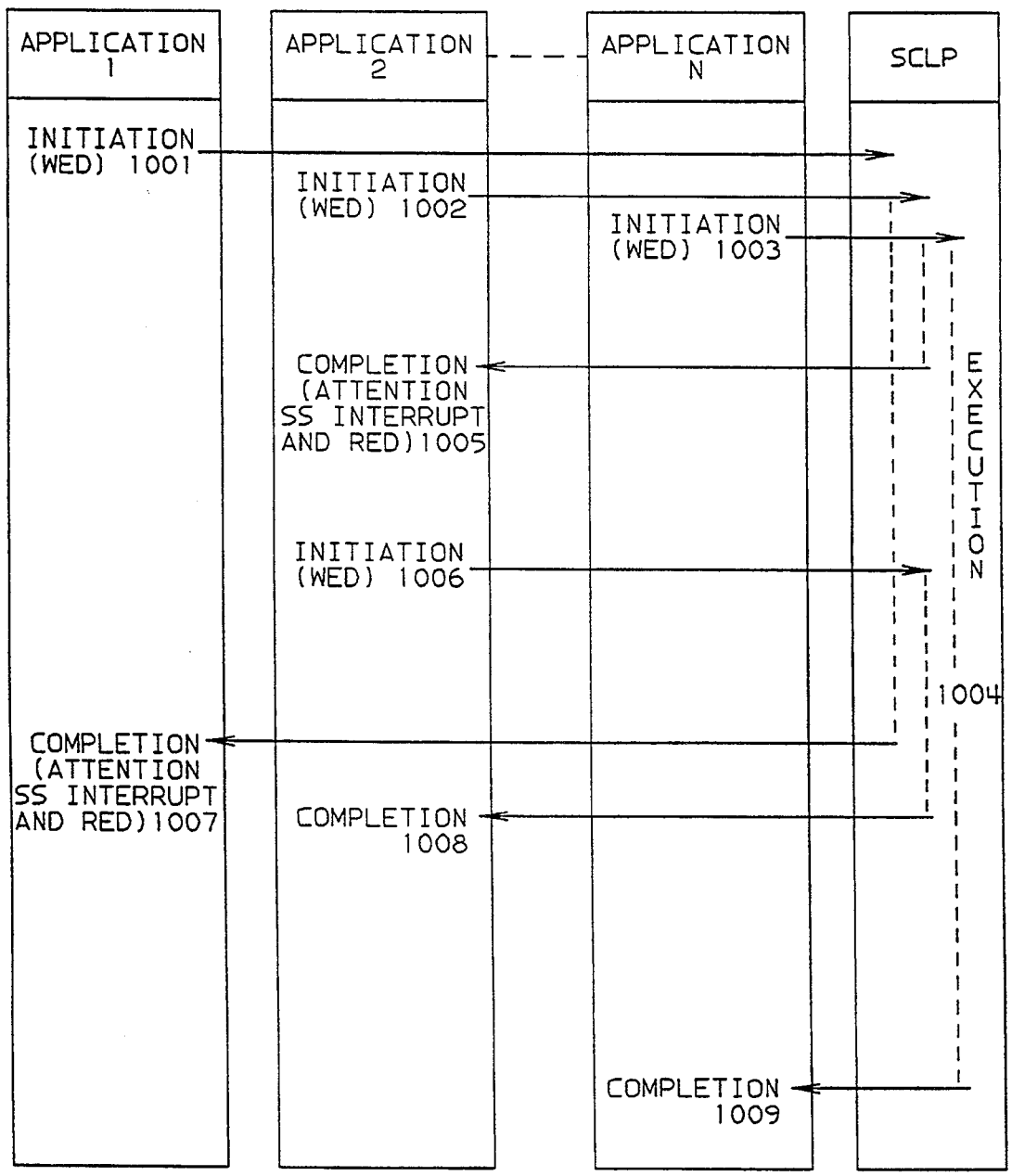

FIG. 10 is a logic/data flow diagram illustrating multiplexed SCLP request execution.

Figure 11:
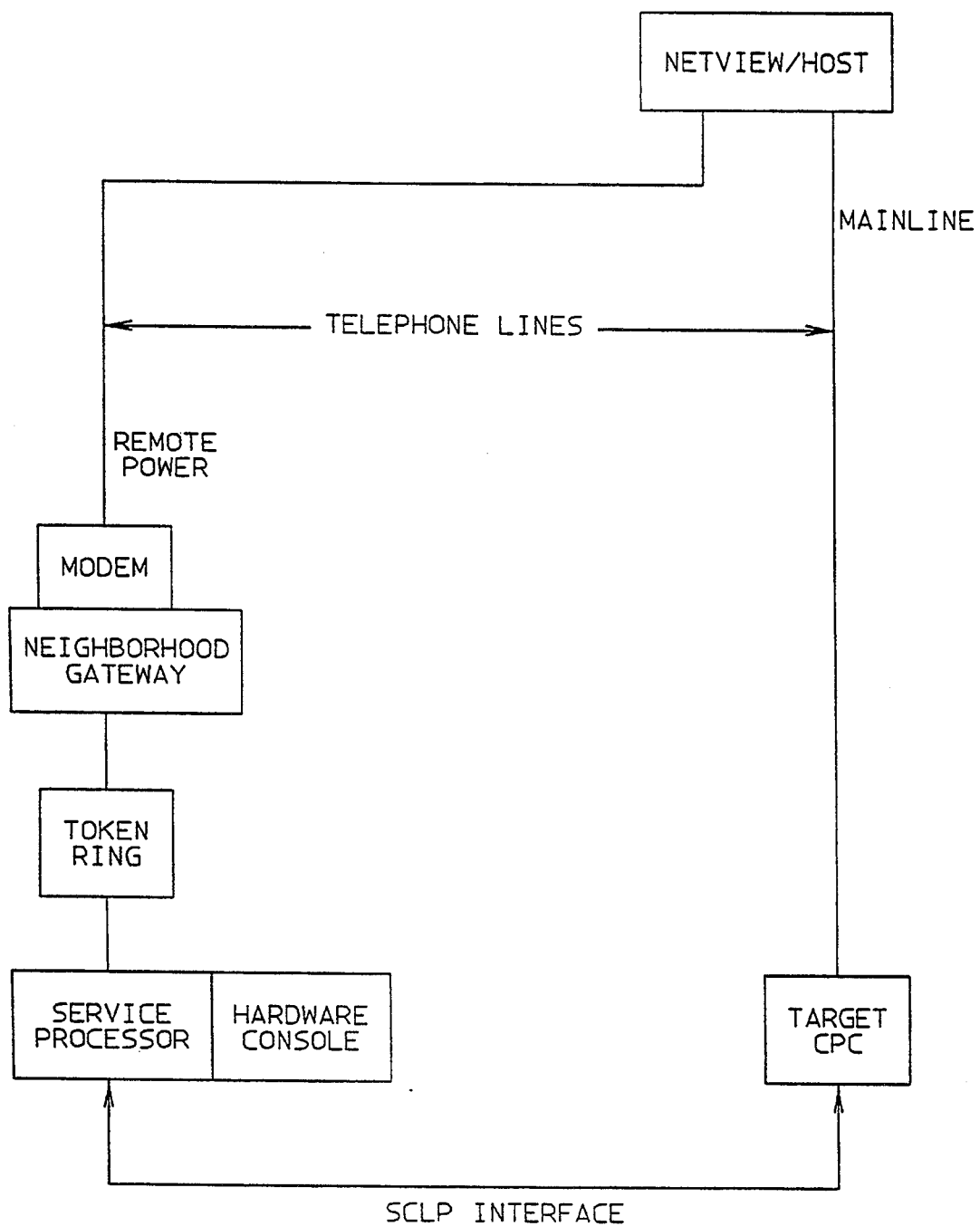

FIG. 11 is a block diagram illustrating the SCLP transport layer in a CPC network.

FIG. 12 is a block diagram showing the sample event and facilities mask structures supported by the present invention.

FIG. 13 is a block diagram showing the results of the process that determines the allowed data transfers between CP and SCLP.

Figure 14:
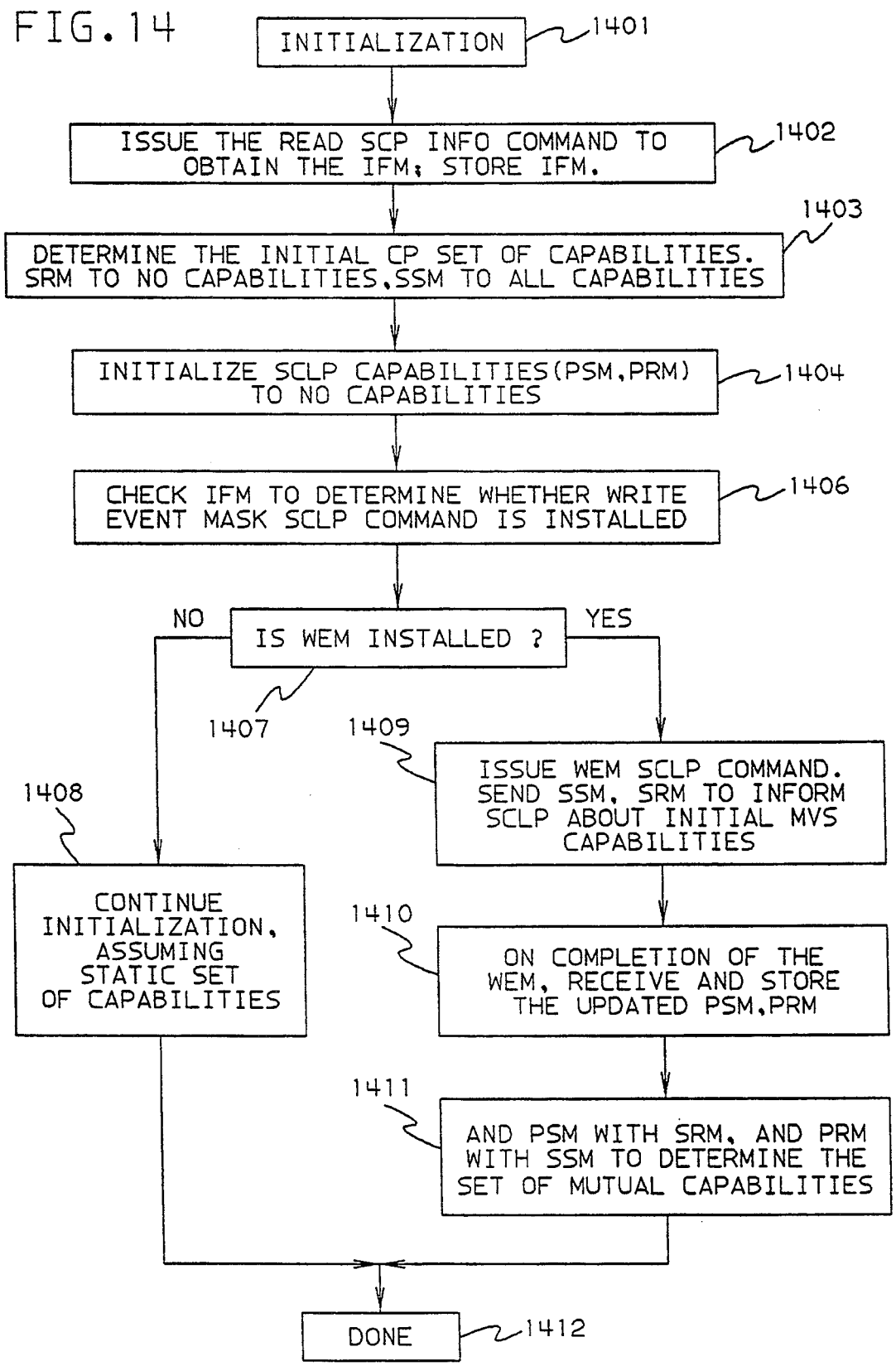

FIG. 14 is a flowchart showing the method of initializing (at initial load time) the tables resident in the SCLP and CP that contain the indications (in mask format) of the SCLP events that the SCLP and CP are enabled to process.

Figure 15:
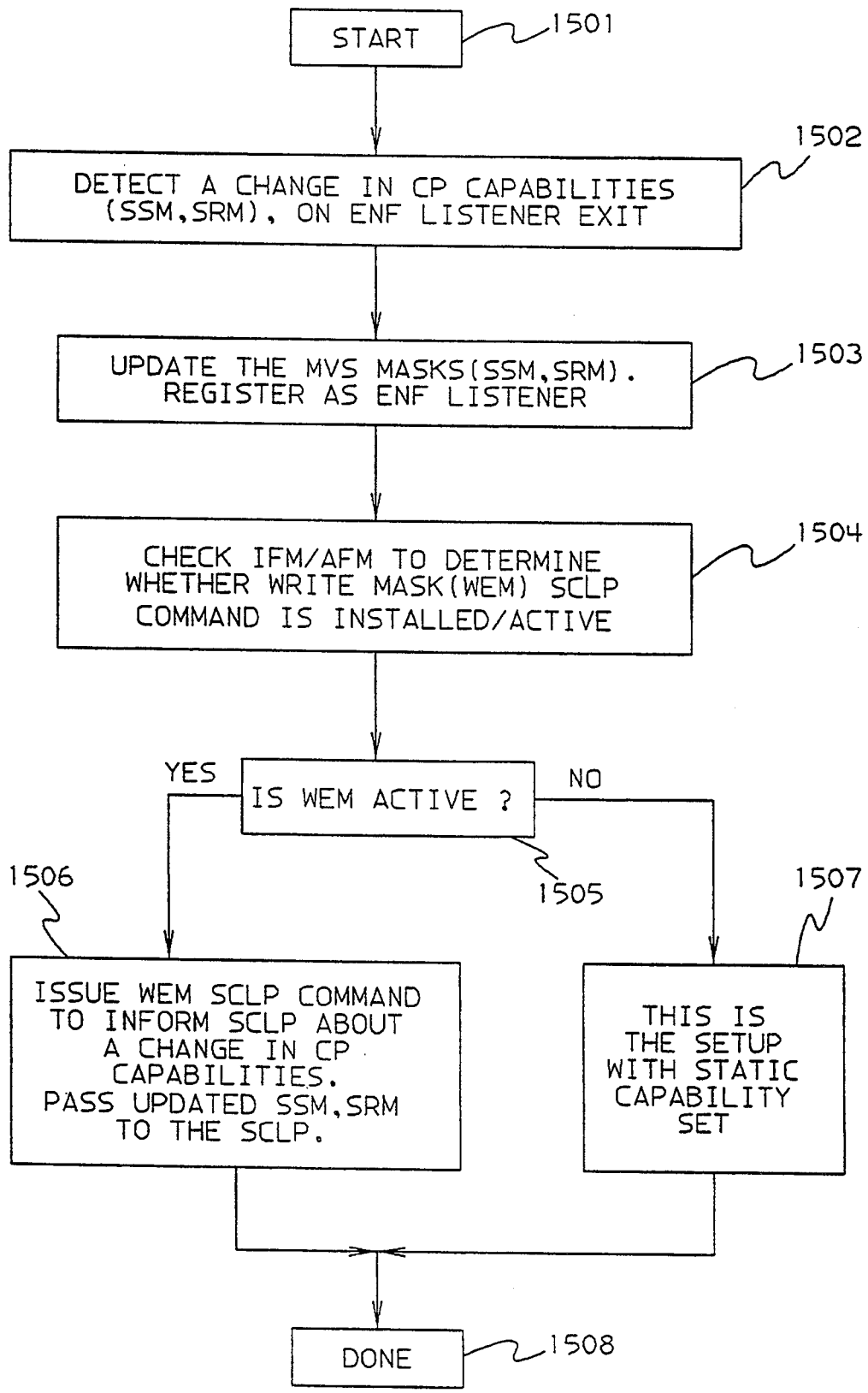

FIG. 15 is a flowchart showing the method of effecting a dynamic change to the tables resident in the CP and SCLP which contain the indications (in mask format) of the SCLP events that the CP is enabled to process.

Figure 16:
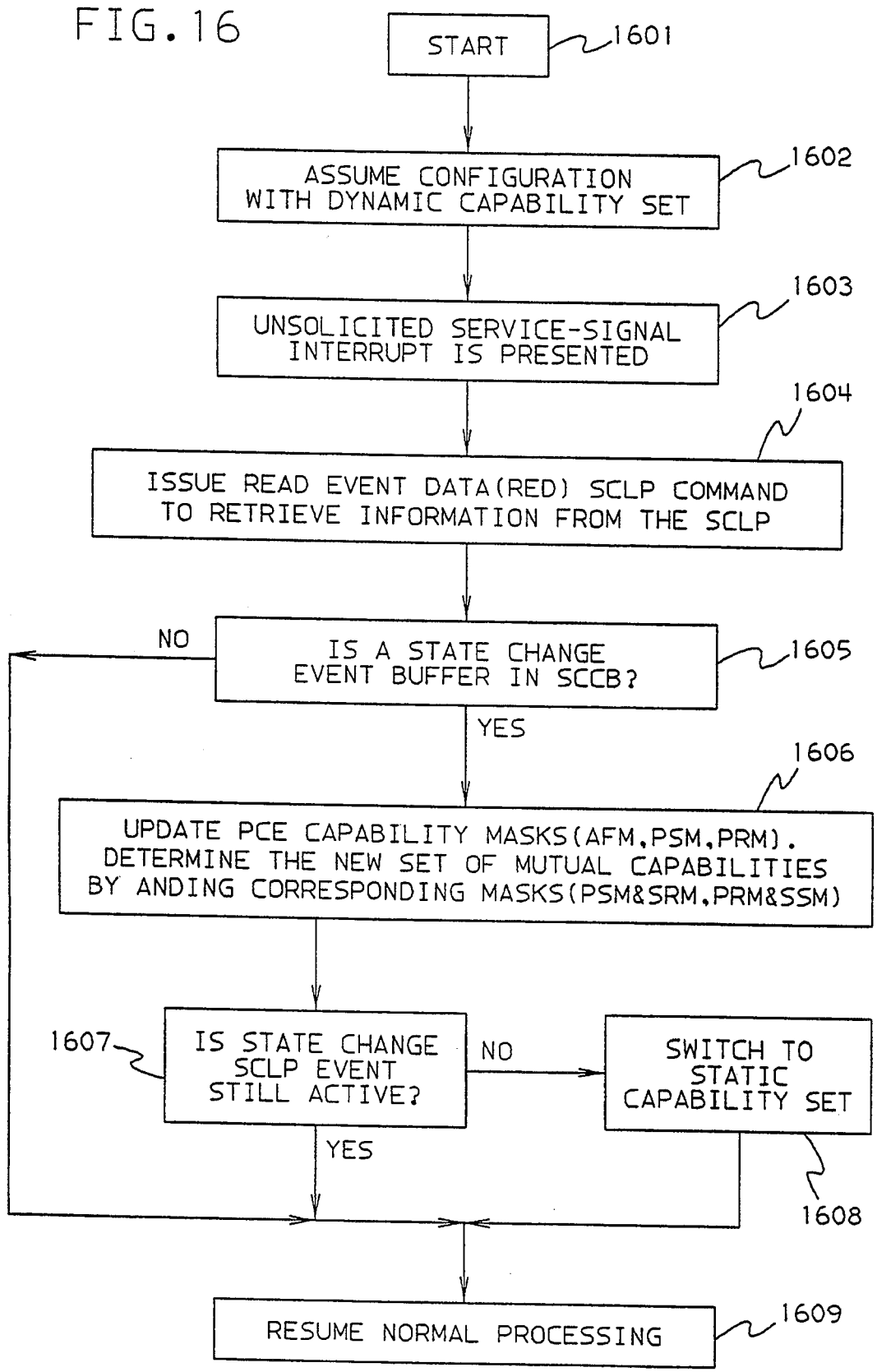

FIG. 16 is a flowchart showing the method whereby the CP detects a change to the set of events that the SCLP is capable of processing which is reflected in the change to the tables resident in the CP and SCLP which contain the indications (in mask format) of the SCLP events that the SCLP is enabled to process.

Figure 17:
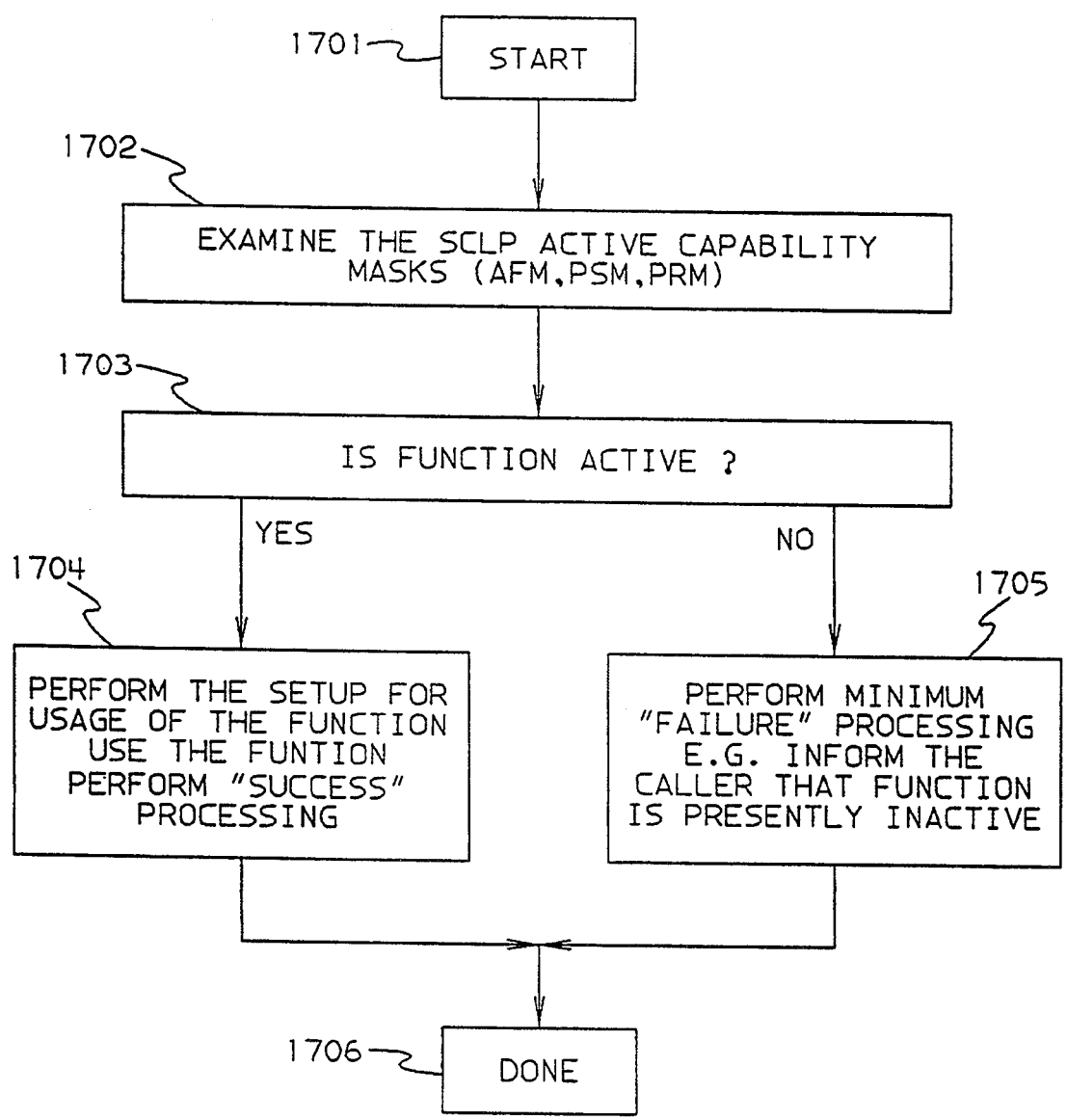

FIG. 17 is a flowchart showing the method of an CP determining beforehand that the SCLP is capable of honoring a CP request so that it sends requests to the SCLP that have a high degree of certainty of being processed.

FIG. 18 is a logic/data flow diagram illustrating the process of execution of a CP request by an SCLP.

DESCRIPTION OF THE PREFERRED EMBODIMENT

Even though the preferred embodiment describes the invention in terms of the SCLP and CP, it will be appreciated by those skilled in the art that the invention can be used generally and applied to many other objects that are capable of communicating and are connected by a communication path.

Definitions

The following terms are new elements introduced in this invention:

SS Attention Interrupt

Presented to the CP by the SCLP to indicate that it has some data to pass to the CP.

Event Type

A category of data being transferred (for example, message or problem management data).

Event Buffer

A packet of data of a given event type.

Event Mask

A bit map where each bit corresponds to an event type and is used to indicate enablement for each event type.

Write Event-Data SCLP Command (WED)

The SCLP command used to transfer a set of event buffers from the control program to the SCLP.

Read Event-Data SCLP Command (RED)

The SCLP command used by the CP to initiate the transfer of a set of event buffers from the SCLP to the control program.

Write Event-Mask SCLP Command (WEM)

The SCLP command used to enable/disable event-buffer data transfer. It indicates to the SCLP what event types the control program is prepared to support. The response from the SCLP indicates the event types the SCLP supports.

Write Return-Event Data SCLP Command (WRED)

The SCLP command used to return to the SCLP one or more event buffers that are not capable of being processed by the control program. This function may be used in certain recovery scenario.

Read Selective Event Data SCLP Command (RSED)

The SCLP command that allows the control program to retrieve a specified subset of event types from the SCLP. The subset is with respect to the set of event types that were enabled for receipt by the control program as a result of a prior write-event-mask SCLP command.

Processing Overview—Dynamic Capability Exchange (DCX)

This invention describes a methodology whereby the SCLP and CP can notify each other of their initial processing capability and subsequently DYNAMICALLY notify each other whenever there is either an increase or a reduction in that capability. This dynamic capability exchange (DCX) uses a novel protocol called the SCLP event transport layer.

Processing Overview—Transport Layer

The methods for communications between the CP and SCLP are improved with this invention.

1. The SCLP and control program are equal partners rather than a master-slave couple.
2. Multiplexing of events and event related data is supported.
   Unlike regular SCLP commands, which allow only one function to be performed at a time, a single event-related SCLP command can cause multiple actions to be performed in parallel by bundling/grouping more than one event buffer in an SCCB.
   The interface between the CP and SCLP can handle one or many event data-transfers at one time, thereby implying multiplexing of requests in either direction.
   Also this method avoids unnecessary uses of its interfaces, by bundling all pending requests in the current transaction.
   There is a higher protocol that uses the SCLP. The SCLP, as an intermediate node in passing an event from an external originator to the CP, if required, can now return some acknowledgement to the originator of the event that it was received at its final destination. The SCLP also does not need to "remember" events that it has passed to the SCP.
3. The protocol includes priority support. Certain event types perform the same function but have different priorities and different usage. For example, there are separate event types for normal messages and emergency messages.
4. The protocol has provisions to communicate the momentary inability to process an event.
   If a failure occurs in processing of the event by either side, it can be communicated to the other side.
5. The protocol has a provision for the SCLP to indicate to the control program that it is temporarily out of buffer space, thereby signalling the control program to slow down the passing of more data to the SCLP.
6. The protocol supports a spanning function for the situation where the transported data exceeds the size of the basic transporting unit.
   If it is necessary to send a data item larger than can fit in the SCCB, it may be broken up into smaller pieces, where each piece is packaged in an event buffer with an inserted sequence identifier.

FIG. 2 illustrates the communication between the CP and the SCLP in the invention. It is bidirectional communication initiated by the SCLP or the CP.

The design of this two-way communication is built around the definition of a series of "events" called the SCLP event types. Either the CP or SCLP will perceive or perform an event, notify the other of its occurrence, and where appropriate, pass event-related data.

The SCLP uses the SS attention interrupt to initiate the conversation 0201A. The CP uses the newly defined Read Event Data (RED) SCLP command to get the SCLP to pass back event related requests and data to the CP 0102.

The CP initiates the conversation by the newly defined Write Event Data (WED) SCLP command 0201B. The CP then waits for the SS (Service Signal) external interrupt 0202 to see the disposition of the events passed to the SCLP via the WED command.

Some examples of events are:
A message from the CP to the operator or another system.
A command from the operator or another system to the CP.
Problem-related data generated by either for processing by the other.

Most events are bidirectional (that is, they can be either sent or received by both the SCLP and CP).

This new event facility, the set of events that it supports and the new SCLP services (e.g., the commands) constitute a transport layer for the bidirectional communication between the CP and SCLP 0203.

Processing Detail—Transport Layer

Figure 1:
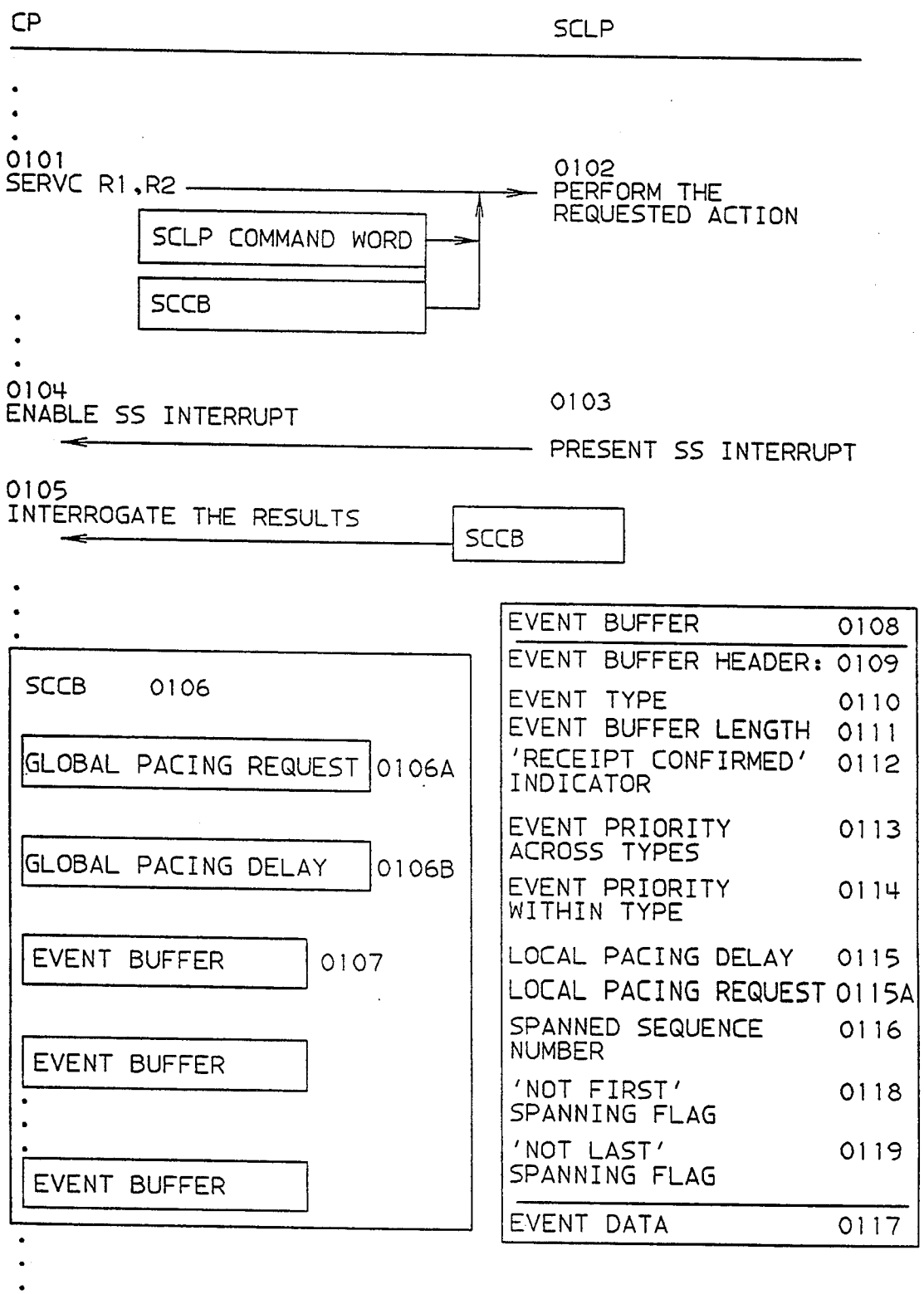
FIG. 1 is a block diagram illustrating the SCLP/CP communication primitives and the data layout.

The SCLP command mechanism allows the control program to request the SCLP to perform a specific action. Execution of an SCLP command, from the view point of the control program, consists of two phases: issuance of the SCLP command, and completion of the SCLP command. The SCLP command is issued by means of the Service Call instruction (SERVC). FIG. 1 describes the operation of the Service Call instruction. The Service Call instruction has two operands. The first contains the SCLP command word and indicates the specific action being requested on the SCLP. The second contains the absolute address of the Service Call Control Block (SCCB) 0101.

The SCCB contains additional information pertinent to a particular SCLP command. The SCCB is used to pass information to the SCLP on initiation of an SCLP command and to pass information back from the SCLP to the control program at the completion of an SCLP command. The completion of an SCLP command is presented to the CP by an external interrupt names the Service Signal (SS) interrupt 0103 and 0104.

The transport layer of this invention introduces an event buffer. Event buffer 0107 is a block of data that can be transported in an SCCB 0106. Multiple event buffers may be packaged in a single SCCB. An event buffer 0108 consists of two parts: event buffer header 0109 and event data 0117. The event buffer header includes event properties, such as event type 0110, length of the event buffer 0111, the field indicating confirmation of receipt of the event buffer 0112, priority of this event compared to other events of all types 0113, priority of this event compared to other events of the same type 0114, pacing delay 0115, and a sequence number of this event buffer within a spanned sequence 0116.

Events passed to the CP from the SCLP may originate:
 In the SCLP.
 In hardware attached to the SCLP/PCE.
 From a local operator.
 From another system.

Peer-to-Peer Protocols

Prior to this invention, the control program was always requesting functions of the SCLP, and the SCLP would always be the one performing actions. Now, the picture is symmetric: either side may request actions of the other one. For example, the SCLP can request the control program to issue a message, generated by hardware, but displayed on a console managed by the control program.

FIGS. 3, 4, 5, 6 and 7 describe the protocols between the control program and the SCLP; where either side can initiate data transfer, and where the control program can select a set of data items it wants to receive at any given moment by using the Read Selective Event Data SCLP command.

FIG. 3 illustrates the data transfer from the CP to the SCLP. The CP issues the WED SCLP command 0301 to pass event buffers stored in the SCCB to the SCLP. The SCLP processes the receipt of the event buffers passed by the CP 0302. When the event buffers are received, the SCLP signals completion of the WED SCLP command by an SS interrupt 0303.

FIG. 4 illustrates the data transfer from the SCLP to the CP. The SCLP presents the CP with an unsolicited SS attention interrupt 0401. When the CP receives the SS attention interrupt, it issues the RED SCLP command 0402 to obtain data SCLP wishes to send. The SCLP stores the event buffers in the SCCB provided by the CP with the RED SCLP command 0403. When event buffers are stored in the SCCB, the SCLP signals completion of the RED SCLP command by a solicited SS interrupt 0404. The CP processes the event buffers stored in the SCCB 0405.

If the SCLP could not fit all the data it had in a single SCCB and, therefore, has more data to pass to the CP, the SCLP sets a flag with the SS interrupt to indicate to the CP that another RED command should be issued. This effectively combines a solicited SS interrupt and an unsolicited SS interrupt into one interrupt 0402.

FIG. 5 illustrates the data transfer from the CP to the SCLP in the case when some of the event buffers sent by the CP cannot be successfully processed by the SCLP. The CP issues the WED SCLP command 0501 to pass event buffers stored in the SCCB to the SCLP. The SCLP processes event buffers passed by the CP 0502.

If for any reason a particular event buffer cannot be successfully processed, the SCLP resets the "receipt confirmed" indicator in its associated event buffer in the WED SCCB to be returned to the CP 0503. When all buffers are processed (either successfully or unsuccessfully), the SCLP signals completion of the WED SCLP command by a SS interrupt 0504. The CP interrogates the information stored by the SCLP in the WED SCCB 0505 and performs appropriate error handling for event buffers that were not successfully processed.

FIG. 6 illustrates the data transfer from the SCLP to the CP in the case when some of the event buffers sent by the SCLP cannot be successfully processed. The SCLP presents the CP with an unsolicited SS attention interrupt, it issued the RED SCLP con, and 0602 to obtain data SCLP wishes to send. The SCLP stores the event buffers in the SCCB provided by the CP on the RED SCLP command. When event buffers are stored in the SCCB, the SCLP signals completion of the RED SCLP command by a solicited SS interrupt 0603. The CP processes the event buffers stored in the SCCB 0604. If for any reason an event buffer cannot be successfully processed, the CP sends it back using the WRED SCLP command 0605. The SCLP receives unprocessed event buffers 0606, performs appropriate error handling, and signals completion of the data return by a solicited SS interrupt 0607. If more data is available to read 0605 (the SCLP could not fit all data it had in a single SCCB and therefore combined the SS attention interrupt with the SS interrupt indicating completion of the RED SCLP command), the CP reissues the RED SCLP 0602. The sequence is repeated until all data is read and either processed successfully or returned to the SCLP.

FIG. 7 illustrates the data transfer from the SCLP to the CP during the time the CP has to temporarily restrict the types of data it is willing to accept. The SCLP presents the CP with an unsolicited SS attention interrupt 0701. As CP is temporarily unwilling to accept all data types (e.g., due to CP recovery in progress), instead of the normal RED SCLP command, the CP issues the RSED SCLP command indicating the event types it is willing to accept at the moment 0702. Only the specified acceptable data buffers are stored into the SCCB by the SCLP 0703. When event buffers are stored in the SCCB, the SCLP signals completion of the RSED SCLP command by a solicited SS interrupt 0704. The CP processes the event buffers stored in the SCCB 0705. If for any reason an event buffer cannot be successfully processed, the CP sends it back using the WRED SCLP command. If more data is available to read 0706 (the SCLP would not fit all data it had in a single SCCB and therefore combined the SS attention interrupt with the SS interrupt indicating completion of the RSED SCLP command), the CP reissued the RSED SCLP 0702. The sequence is repeated until all data of desired types is read and either processed successfully or returned to the SCLP. When the temporary condition causing the CP to restrict the set of desired data types is over 0707, the CP issues the normal RED SCLP command 0708 to obtain any pending SCLP events of the types that were temporarily undesirable by the CP. The SCLP now presents all data types to the CP 7080 and indicates completion of the RED SCLP command by a solicited SS interrupt 0709. The CP processes the data and, if necessary, uses the WRED SCLP command to return the event buffers it could not process successfully. If more data is available to read 0710 (the SCLP could not fill all data is had in a single SCCB and therefore combined the SS attention interrupt with the SS interrupt indicating completion of the RED SCLP command), the CP reissues the RED SCLP 0707. The sequence is repeated until all data of desired types is read and either processed successfully or returned to the SCLP.

EXAMPLE

As an example, consider a case of a control program sending messages to the system console and receiving commands from that console. The system console is a facility that is owned by the PCE and so requires an SCLP protocol exchange to accomplish the function. For simplicity, assume that no problems occur during the processing steps execution.

Sending a message to the system console would consist of the following steps as summarized in FIG. 3:

The control program packages the message text in an event buffer of the appropriate type.

The control program then packages the event buffer in an SCCB. There may or may not be additional event buffers of the same or any other type in the SCCB.

The control program then issues the Write Event-Data SCLP command to send the SCCB with the event buffer content to the SCLP 0301.

At this point, the SCLP receives the SCCB, extracts the event buffer, and the message text from it. Then the SCLP queues the received message for eventual display on the system console of the PCE or SVP. Once the enqueuing is done, the SCLP turns on the "receipt confirmed" indicator in the event buffer in the SCCB in main storage 0302. Subsequent processing may involve sending the message to a remote system console at some other network node.

Completion of the SCLP command is indicated by a service-signal external interrupt 0303.

By completing the operation at the enqueuing stage, the SCLP is able to complete the Write Event-Data SCLP command sooner, thereby not penalizing the control program for the additional time spent in actually accomplishing the display part of the function. This is even more significant when the system console is remote, as there are network delay times involved.

Sending a command to the control program from the system console is performed as follows:

An operator enters a command on the system console, or a command arrives from the remote system console via a network connection available to the SCLP. At that time, the SCLP packages the command in an event buffer, and presents the CP with a service-signal attention interrupt.

At some point, a service-signal attention interrupt arrives 0401. In certain situations, the SCLP may instead choose to present the indication of an event transmission via a service signal interrupt. See the discussion below on, Dual Mode SS Interrupts.

The control program issues the Read Event-Data SCLP command due to the prompt implied by the service-signal attention interrupt 0402.

When the service-signal interrupt arrives 0404, the SCLP puts the event buffer for the system console command into the SCCB provided by the CP with the RED command and then presents an SS interrupt to the CP 0403.

CP extracts the event buffers stored by the SCLP in the SCCB.

CP processes the received operator command(s) 0405.

If the SS interrupt indicating completion of the Read Event-Data SCLP command is combined with the SCLP Attention interrupt, there is more data to read, CP reissues the Read Event-Data SCLP command and repeats the above steps; CP keeps doing that until SCLP runs out of data to transfer 0406.

Dual Mode SS Interrupts ("Piggy Backing")

The transport layer provides the SCLP with the ability to merge or combine a solicited and unsolicited SS interrupt such that only one interrupt (but with the dual implication) is presented to the CP. While the CP at 0401 is normally assuming an SS attention (unsolicited) interrupt, it must still be prepared for the possibility that notification from the SCLP will be "tacked onto" an SS interrupt (solicited).

This would occur when the CP is expected an SS interrupt for some recently issued SCLP command at the same time as the SCLP needed to initiate some event transmission to the CP (for example, the passing of an operator command from the system console).

In this situation, the SCLP delays the presentation of the unsolicited interrupt until the processing of the earlier issued SCLP command is complete. It then notifies the CP of both the SCLP command completion and the SCLP's initiation of an event transmission via the presentation of a single interrupt.

FIG. 8 describes the notification scheme whereby the CP detects a change in its functional capabilities 0801, it notifies the SCLP 0802. The SCLP's reaction to this is to subsequently request from the CP only those functions indicated as processable by the CP in the notification 0803. Similarly, when the SCLP detects a change in its functional capabilities 0804, it notifies the CP 0805, which reacts similarly to the reported change 0806.

This allows both the SCLP and CP to know "before the fact" what functions each can request from the other and never have to submit one that would fail. Since the capabilities of both the CP and SCLP can change during normal operation. This mechanism gives both the means to immediately notify the other of such changes in capability. It can also ensure that a receiving CP is NEVER passed events that it cannot process or that are of no interest to any presently-active program.

When the CP needs to pass an event to the SCLP or to request some service (such as physical CPU reconfiguration), it first determines that such an event or service can be processed by the receiver, and then issues an SCLP command to transmit the event data or request the service.

FIG. 9 illustrates the process of the SCLP requesting actions from the CP. When the SCLP experiences a need to have the CP perform an action 0901, it presents the CP with an SS attention interrupt (unsolicited) 0902. The CP receives the SS attention interrupt 0903 and reacts to it by a RED SCLP command 0904. The SCLP stores the request information packaged in an event buffer in the SCCB provided by the CP on the RED SCLP command 0905, and sends it to the CP when the SS interrupt indicating completion of the RED SCLP command 0906 is presented. The CP extracts the request from the event buffer in the SCCB 0907 and processes it 0908. When the request processing is complete, the CP generates a completion report, packages it in an event buffer in the SCCB 0909, and sends it to the SCLP via a WED SCLP command 0910. The SCLP extracts the completion report from the event buffer in the SCCB, interrogates the results of the request execution 0911, and presents the CP with an SS interrupt indicating completion of the WED SCLP command 0912.

Multiplexing

An SCLP request represents a transaction, consisting of three parts:
1. initiation
2. execution
3. completion.

The initiation phase of an SCLP request occurs when the sender presents the request to the receiver.

For requests sent from the SCLP to the CP, this phase begins when the SCLP presents the attention SS interrupt 0902, and ends when the SCLP responds via the SS interrupt with the completion status of the CP-issued RED 0906.

For requests sent from the CP to the SCLP, this phase begins with CP issuing the WED to the SCLP 1802 and ends when the SCLP responds via the SS interrupt for the CP-issued WED 1804.

The execution phase of an SCLP request occurs when the receiver processes the request.

For requests sent from the SCLP to the CP, this phase begins when the CP extracts the request from the event buffer 0907, and ends when the CP generates the completion report for the request and packages that report in the event buffer 0909.

For requests sent from the CP to the SCLP, this phase begins when the SCLP processes the request 1805, and ends when the SCLP generates a completion report and packages that report in the event buffer 1806.

The completion phase of an SCLP request occurs when a receiver presents (to the sender) a completion report that contains the results of the execution.

For requests sent from the SCLP to the CP, this phase begins when the CP sends the completion report to the SCLP via the WED 0910, and ends when the SCLP responds via the SS interrupt for the CP-issued WED 0912.

For requests sent from the CP to the SCLP, this phase begins when the SCLP presents the completion report to the CP via the SS attention interrupt 1807, and ends when the SCLP responds via the SS interrupt to the CP-issued RED 1811.

In the prior art, the execution of SCLP requests were performed via SCLP commands which had to be serialized. So, only one SCLP function at a time could be in process. Others had to wait for the SCLP to free up.

With the introduction of SCLP events, the SCLP transaction stages have been separated in such a way that the most lengthy stage (execution) does not have to be serialized across the SCLP/CP interface. With the invention, it is now possible to overlap execution of SCLP requests between applications.

Unlike previous SCLP commands, which allow only one function to be performed at a time, SCLP event-related commands can cause multiple actions to be performed in parallel by bundling/grouping more than one event buffer in an SCCB.

Even though event buffers may be transferred across the CP/SCLP interface together, their execution, most likely, will not complete at the same time. If the processing of each event includes generation of a report, these multiple reports may not arrive together.

Processing of a set of event buffers does not have to be complete for more event buffers of the same or other types to be delivered across the CP/SCLP interface. Completion of the initiation phase (part), allows the submission of additional events to the interface.

FIG. 10 illustrates a possible scenario of overlapped SCLP request execution. Application 1 initiates an SCLP request (via WED) 1001. After receipt of the SS interrupt for Application 1's initiation, Application 2 and application N can initiate their SCLP requests (also via WED) one at a time 1002, 1003. The SCLP can start concurrent execution of requests from various users 1004. Execution of request from Application 2 completes first and completion is signalled to the application (via an unsolicited attention SS interrupt to the CP). This triggers a RED from Application 2 1005. Execution of requests from Application 1 continues. In the meantime, Application 2 initiates another request 1006, which SCLP starts executing concurrently with outstanding requests from Application 1 that are already in progress. Then Application 1 request's execution completes and completion is signalled to the application 1007. Similarly, completion of the new request 1006 from Application 2 is signalled 1008.

Priority Support

The protocol includes priority support.

A set of event buffers placed in an SCCB in a certain order will not necessarily be performed in that order.

Event processing is prioritized at different levels:

Static priorities are defined between event types.

By definition, certain event types are assigned a higher priority than others. Event buffers are processed in a priority order, not in the order in which they appear in the SCCB.

Certain event types perform the same function but have different priorities and different usage. For example, there are regular message and priority message event types: one used for regular message traffic, and the other for system recovery.

Dynamic priorities may be imposed on event types to override the static ones.

In certain cases, it may be necessary to override the statically defined event type priority assignment in a dynamic fashion. For that purpose, a field is defined within an event buffer 0113, containing a value that denotes a dynamically assigned priority value. When an event buffer with a nonzero event-type-level priority value is passed, the receiver is responsible for treating it in accordance with the specified value, and prioritizing accordingly compared to other event types.

Dynamic priorities may be assigned to events of a given type.

Within a given event type, when several events of that type are passed concurrently between the SCLP and CP, it may be desirable to indicate order of their processing by the receiver. That is done by means of event priority field 0114 indicating event priority compared to events of the same type. A numeric value stored in that field is compared by the receiver to the corresponding values in the same field of the event buffers of the same type when processed concurrently. The buffer with the highest value is processed first.

Communication of Momentary Inability to Process An Event

If a receiver cannot process an event, that can be communicated to the sender. The SCLP communicates this inability by turning off the "receipt confirmed" indicator in the event buffer 0503. The control program communicates this inability by using a Write-Return Event-Data SCLP command to send unprocessed event buffers to the SCLP 0605. In both cases, the unprocessed data is returned to the originating party. This permits the originating party to exercise recovery alternatives with the assurance that the processing initiative has indeed been withdrawn from the originally chosen path.

Either side can hold data pending in the case of temporary data transfer disruption 0703. For certain event types holding them pending is mandatory. For others it is optional, or even disallowed.

The requirement to hold event data pending may be assigned statically (by defining a particular event type as requiring to be held pending if cannot be delivered) or dynamically (be defining a "hold pending" request indicator in the event buffer to be set by the event buffer sender).

Pacing

Current implementation of the SCLP in a PCE or SVP are usually constrained on buffer space. The protocol has a provision for the SCLP to indicate to the control program that it is temporarily out of buffers, thereby signalling the control program to slow down in passing more data to the SCLP.

The pacing scheme included in the SCLP/CP communication protocol may be global or localized within a particular event type.

Global
When constrained in buffer space needed for processing of all event types, the receiver of events indicates that event buffers cannot be accepted by not turning on the "receipt confirmed" indicator in the event buffer 0112. In addition to that, a pacing indicator is set in the SCCB 0106A to indicate that a delay in transmission of event buffer is requested; an appropriate pacing delay may also be stored in the SCCB 0106B.

Local within event type
When constrained in buffer space needed for processing of events of a specific type, the receiver of events indicates that event buffers of that type cannot be accepted by not turning on the "receipt confirmed" indicator in the event buffers 0112 of that type. In addition to that, a pacing indicator is set in the event buffers requiring pacing 0115A to indicate that a delay in transmission of event buffers of that type is requested; an appropriate pacing delay may also be stored in the event buffer 0115.

The pacing delay may be static, determined once, built into the system, and known by both SCLP and CP. In some cases, it may be necessary to override the static pacing delay with a different value. In those cases, the pacing delay is conveyed by the receiver of the data to the sender in the SCCB 0106B if global pacing is desired, or in an event buffer 0115 if pacing is desired for a specific event type.

Spanning

As the CP/SCLP data transfers still use SCLP commands, and therefore SCCB, as a basic transporting unit, the amount of data transported by one command is limited to 4088 types. If it is necessary to send a data item larger than can fit in the SCCB, it may be broken up into smaller pieces, each packaged in an event buffer with an inserted sequence identifier. Each may be transported separately as a packet, and then all may be collected on the receiving end using the sequencing field defined in the event buffer.

Since the sequencing field is present, all packets are transmitted independently, and if a problem occurs when sending one of them, others do not have to be affected, it is only necessary to retransmit the failing one.

Processing Detail—DCX

This invention describes a methodology whereby the SCLP and CP can notify each other of its initial processing capability and subsequently DYNAMICALLY notify each other whenever there is either an increase or a reduction in that capability. This methodology requires:

1. The definition of an "event mask" (either a send mask or a receive mask) where every defined event is represented by a bit in the mask. A bit setting of one indicates that the event can be processed, a setting of zero indicates that the event cannot be processed.

FIG. 12 illustrates four separate manifestations of this mask where each mask defines a capability of the SCLP or CP for data (EVENT) transfer in a specified direction.

a. The SCLP Event Send Mask (PSM at 1203), the mask of event types that the SCLP is capable of transmitting to the CP.
   b. The SCLP Event Receive Mask (PRM at 1202), the mask of event types that the SCLP is capable of processing (receiving).
   c. The operating system event Send Mask (SSM at 1203), the mask of event types that the CP is capable of transmitting to the SCLP.
   d. The operating system event Receive Mask (SRM at 1204), the mask of event types that the CP is capable of processing (receiving).

FIG. 13 illustrates how the resultant allowed data/EVENT transfers are determined.

a. ANDing the SCLP Send Mask (PSM) with the operating system Receive mask (SRM) determines the set of event types that can be transferred from the SCLP to the CP 1301.
   b. ANDing the SCLP Receive Mask (PRM) with the operating system Send Mask (SSM) determines the set of event types that can be transferred from the CP to the SCLP 1302.

The size of the mask structure is defined by the operating system and accommodated by the SCLP.

2. The operating system initially builds a mask of event types that it is capable of sending (SSM), and a mask of event types that it is capable of receiving (SRM).

The two initial operating system masks are placed in the SCCB and passed to the SCLP by issuing the Write Event Mask SCLP command.

The SCLP responds by initializing the SCLP Send and Receive masks (PSM and PRM) in then SCCB provided by the CP, and presents them to the CP via an SS interrupt.

FIG. 14 describes this initial capability exchange between the CP and SCLP. Note that this aspect of the preferred embodiment is described with reference to IBM's MVS/ESA Operating System.

Read SCP Info SCLP command, among other things, returns a mask of installed SCLP facilities (IFM). This mask is in addition to the four event masks referenced above. Each bit in the mask corresponds to a particular facility (e.g., CPU Reconfiguration). Each facility, in turn, may represent a group of one or more SCLP commands (e.g., CPU Reconfiguration facility would include Read CPU Information, Configure CPU, and Deconfigure CPU SCLP commands) 1402.

The initial set of CP capabilities is CP-specific. At this time in the initialization sequence, MVS is not capable of receiving any events (so, SRM is 0). At this time, MVS will not be sending any events, but for simplicity, MVS sets its send mask (SSM) to a full set of capabilities it expects to acquire when initialization completes 1403.

At this time, MVS does not know what events SCLP is capable of processing. MVS assumes that SCLP cannot process any until SCLP indicates what it can do 1404.

One of the SCLP facilities defined (or derived) by the SCLP's response to the IFM is the ability to process events 1406 and 1407. The event processing facility includes the following SCLP commands:
Write Event Mask,
Write Event Data,
Write Return Event Data,
Read Event Data,
Read Selective Event Data.

If the corresponding bit in the IFM is on, the event processing facility is installed, and MVS may attempt to learn the set of SCLP event capabilities by issuing the Write Event Mask SCLP command. At the same time, MVS will inform the SCLP about the operating system capabilities by sending its SSM and SRM in the SCCB provided with the WEM command 1409.

When a solicited Service Signal external interrupt arrives indicating completion of execution of the Write Event Mask SCLP command, and if the execution of the command was successful, the SCLP has stored its send and receive masks (PSM, PRM) in the SCCB. MVS stores these masks for future reference 1410.

Logical ANDing of the corresponding masks results in the mutual set of the capabilities (i.e., in order for an event to be used, one party must be able to send it, and the other must be able to receive it) 1411.

If the event processing facility is not installed, then there will be no notification of any changes in the SCLP capabilities reported in the future, and the CP sets the PSM and PRM masks of the SCLP to 0, indicating that the SCLP is incapable of processing events 1408.

3. A new SCLP command with which the CP informs the SCLP which events it can both send and receive (by providing PRM and PSM masks in the SCCB). The SCLP's response to this command includes the SSM and SRM which tells the CP of the SCLP's capabilities.

The Write Event Mask SCLP command is defined. It allows the SCLP and CP to exchange the sets of events they can process.

FIG. 15 describes this process where the operating detects a change in its capabilities.

Detecting a change in CP capabilities may mean several different things. It may be that MVS has reached a particular stage of its initialization at which point it knows that its capability set has changed. It may be that a new subsystem or application has been initialized which adds a capability not previously supported by the CP. It may be that function that provided some capability has shut down. It may be that the operator has activated a different console configuration (the one that now includes or excludes the system console from the configuration). It may be that a network connection has been established on the software side that now allows pass-through of data via the SCLP interface, etc. 1502.

Before the Write Event Mask SCLP command is issued to inform the service processor about a change in the MVS capabilities, MVS checks whether the Write Event Mask SCLP command is installed and presently active by checking the appropriate bits in the installed and active facilities mask (IFM, AFM). The AFM is discussed later in number 4. In practice, it is enough to just check the active facilities mask (AFM) since it is always a subset of the installed facilities mask (IFM) 1504 and 1505.

If the event facility is installed and active, the WEM issued to notify the SCLP about a change in the capabilities. Depending on what the change is, SCLP may or may not take some follow up actions. For example, if MVS has lost a capability to receive a particular event type, SCLP may purge the accumulated data to be delivered via that event type, or send it back to the originator, or keep it buffered with the expectation that MVS will reacquire its capability to receive this information 1506.

If the event facility is not installed or inactive, MVS has been running with a static capability set 1507.

4. A "State Change" event is generated by the SCLP and passed to the CP whenever any change in the active status of hardware facilities occurs. The data provided with a State Change event consists of masks 3 and 4 (above) and a third mask (the Active Facilities Mask or AFM) indicating which of the installed services (that are not event related) are now active in the SCLP. This third mask is an update to the "installed facilities map" (IFM) that the CP requests from the SCLP during IPL.

FIG. 16 describes this process.

Detection of SCLP capability change as indicated by the State Change SCLP event may only occur if dynamic capability exchange is active. The fact that bidirectional dynamic capability exchange is active is indicated by the event facility being active (AFM) and by the SCLP being capable of sending the State Change event (PSM) and MVS being capable of receiving the State Change event (SRM) 1602.

The SCLP presents an (unsolicited) service-signal attention interrupt to the CP to notify the CP that the SCLP has an event that needs to be transmitted to the CP 1603.

Read Event Data SCLP command is used to retrieve information from the SCLP. On completion of the command, any information the service processor had in the form of events is packaged in the SCCB (which is up to 4096 bytes in size) 1604.

MVS searches through the event buffers packaged in the SCCB it retrieved on the Read Event Data SCLP command. Each event buffer has a header that indicates the event type. If an event buffer with a header indicating that this is a State Change event buffer is found, then a change in the capabilities has occurred in the SCLP (except, maybe, if this is the first State Change after MVS was IPLed and the unsolicited interrupt has arrived shortly after MVS indicated that it is now capable of accepting the SCLP State Change). IPL was performed while the set of the active facilities of the machine was different from the set of installed facilities) 1605.

If a State Change event buffer was found in the SCCB, MVS refreshes its masks using those passed in the State Change event buffer 1606.
The actual ANDing of corresponding masks may not be performed at this time. The determination of a capability being active can be made at the time a need to use it arises, or when some decision is being made that involves the availability of a certain capability (for example, if an MVS console is to be taken off-line, MVS may check whether the system console is available).

If the newly obtained SCLP capability masks indicate that the dynamic capability exchange is no longer possible, the mode of MVS operations is switched to the static capability set, and MVS will not expect to receive any further State Change notifications 1607 and 1608.

The State Change event includes the notification of:

a. The complete/partial and temporary/permanent loss of SCLP processing capability.
If the State Change event buffer indicates that the SCLP is no longer able to support the events apparatus, or send subsequent State Change events, then the loss of SCLP processing capability is permanent; otherwise, it is considered temporary.
Indication of complete and partial loss of capability is accomplished by exploiting the granularity of the bit mask representation.

b. Only the most recent processing state if the SCLP detects multiple State Changes before an "initial" State Change is received by the CP.
If multiple SCLP State Changes occur before the CP receives the State Change SCLP event, SCLP is responsible for building a cumulative State Change buffer, reflecting the final SCLP state and presenting that cumulative buffer to the CP the next time CP receives the State Change event.

c. An initial difference (that is during IPL) between the facilities that are installed and that are operational in a system.
If during CP initialization the set of active SCLP facilities is different from the set of installed SCLP facilities, SCLP is responsible for reporting that difference to the CP via a State Change event (even though the same State Change may have been reported to the control program running on the CPC prior to the initialization of this CP).

If the CP has indicated (via CP receive mask) that the State Change event is one that it cannot process, the SCLP will hold the event pending. The SCLP will keep the mask updated to reflect the current processing capability and when the CP indicates the capability to process State Changes, will present the interrupt reflecting the State Change event.

FIG. 17 describes the scenario for using the DCX.
If the dynamic capability exchange is available, the set of currently active functions is known and can be checked before attempting to use the SCLP functions 1702 and 1703.
If a function is inactive, no SCLP commands will be issued by MVS, instead, an immediate failure processing will be performed. E.g., for a CONFIG CPU(x),OFFLINE operator command, an operator message indicating that the function is presently unavailable will be issued, and the state of the CPU in relation to the SCLP remains unchanged 1705.
If the function is active, whatever preparation is necessary to use the function can be performed (but now it is known that the lengthy preparation work will not, be in vain), and the function can be used 1704.

What is claimed is:

1. An apparatus for communicating dynamic changes in capabilities of processors for use in a data processing system comprising two or more processors each having storage, said data processing system further comprising a communication path between a pair of the two or more processors, said apparatus comprising:
   (a) current capability definitional means, within each of the two or more processors, for identifying a current set of processor functional capabilities associated with the processor containing said current set;
   (b) detection means, within each of the two or more processors, for detecting a change to said current set of processor functional capabilities and updating said current capability definitional means, creating an updated current capability definitional means;
   (c) communication means, invoked by said detection means, for communicating a copy (termed a communicated copy) of said updated current capability definitional means, associated with a sending processor of the pair of processors, from said sending one to a receiving one of the pair of processors, using the communication path;
   (d) mutual capability identification means, within the receiving one of the pair of processors, for identifying, in a mutual capability definitional mask, a derived mutual processing functional capability set by combining said current capability definitional means associated with said receiving processor with said communicated copy of said updated current capability definitional means associated with said sending processor, so that each element of said mutual capability definitional mask, if "on" after said combining, identifies a particular processing functional capability which may be requested by one and performed by another of said pair of processors; and
   (e) function request verification means, within the receiving one of the two or more processors, for testing said mutual capability definitional mask means to verify, before requesting a function of the sending processor, that the element of said mutual capability definitional mask associated with the function is "on" and negating the function request if the element is not "on".

2. The apparatus of claim 1 in which the sending one of the processors is a Service Call Logical Processor (SCLP), and the receiving one of the processors is a Central Processor having a Control Program.

3. The apparatus of claim 1 in which the sending one of the processors is a Central Processor having a Control Program, and the receiving one of the processors is a Service Call Logical Processor (SCLP).

4. The apparatus of claim 1 in which said current capability definitional means comprises a send mask, identifying one or more functions which may be requested by said each of the two or more processors, and a receive mask, identifying one or more functions which may be performed by said each of the two or more processors.

5. The apparatus of claim 4 further comprising function request verification means, within the receiving one of the two or more processors, for testing said mutual capability definitional mask means to verify that a to-be-requested function can be performed by said another processor of said pair of processor.

6. A method for operating a computer system, comprising a first and second processing entity, connected by a communication path, to detect and dynamically exchange processing capabilities, said method comprising the steps of:

(a) the first and second processing entity setting a first and second initial function value, respectively, in a first and second local function definition field, to indicate that one or more associated functions may be performed or requested each of said first and second local function definition fields comprising a plurality of bits and having a common function associated with identical bit positions;

(b) the first and second processing entity mutually communicating, over a communication means, the initial function value in their local function definition field and setting first and second local common function values, respectively, in local common function definition fields, each of the local common function values resulting from a logical ANDing of the first and second initial function values and indicating, if "on", that a particular associated function may be requested by one and performed by the other of the processing entities;

(c) the first processing entity detecting that one of the one or more associated functions can no longer be performed, and, in response, changing the first local function definition field to a changed first local function definition value;

(d) the first processing entity communicating the changed first local function value to the second processing entity over the communication means;

(e) the second processing entity receiving the changed first local function value from the first processing entity and, in response, modifying the second local common function value to a modified local common function value; and (f) the second processing entity, requiring the associated function of the first processing entity, testing the modified local common function value and negating a request of the associated function by the first processing entity, in response to the modified local common function value.

7. The method of claim 6 in which the first processing entity is a processor having a Control Program, and the second processing entity is a Service Call Logical Processor.

8. The method of claim 6 in which the first processing entity is a Service Call Logical Processor, and the second processing entity is a processor having a Control Program.

* * * * *